United States Patent
Normand et al.

(10) Patent No.: US 8,801,885 B2
(45) Date of Patent: Aug. 12, 2014

(54) METHOD FOR MAKING A STRUCTURAL PART OF A COMPOSITE MATERIAL HAVING A CALIBRATED THICKNESS AND STRUCTURAL PART THUS OBTAINED

(75) Inventors: Mathieu Normand, Toulouse (FR); Jean-Claude Lacombe, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 932 days.

(21) Appl. No.: 12/595,313

(22) PCT Filed: Apr. 9, 2008

(86) PCT No.: PCT/FR2008/050624
§ 371 (c)(1),
(2), (4) Date: Feb. 1, 2010

(87) PCT Pub. No.: WO2008/139115
PCT Pub. Date: Nov. 20, 2008

(65) Prior Publication Data
US 2010/0136309 A1     Jun. 3, 2010

(30) Foreign Application Priority Data
Apr. 13, 2007   (FR) .................................. 07 54446

(51) Int. Cl.
*B29C 65/00* (2006.01)
*B29C 70/54* (2006.01)
(52) U.S. Cl.
CPC .................................... *B29C 70/545* (2013.01)
USPC ........... 156/154; 156/64; 156/267; 156/307.1
(58) Field of Classification Search
USPC ........ 156/153, 154, 267, 307.1, 307.3, 307.4, 156/307.7, 64, 247, 248, 701; 264/162, 264/258, 259
See application file for complete search history.

(56) References Cited

U.S. PATENT DOCUMENTS

| | | | | |
|---|---|---|---|---|
| 5,573,377 A | * | 11/1996 | Bond et al. ................. | 416/229 A |
| 5,759,325 A | * | 6/1998 | Davis ........................... | 156/154 |
| 5,840,399 A | | 11/1998 | Kozel | |
| 6,018,328 A | * | 1/2000 | Nolan et al. .................. | 343/912 |
| 2002/0160187 A1 | | 10/2002 | Craig | |

OTHER PUBLICATIONS

"Composite Materials Handbook" from the Department of Defense Jun. 2002 pp. i, 1-17, and 12-8.*

* cited by examiner

*Primary Examiner* — John Goff
(74) *Attorney, Agent, or Firm* — Dickinson Wright PLLC

(57) ABSTRACT

The disclosed embodiments offer a solution for controlling the thickness of a finished structural composite part when precise tolerances must be complied with for the quality of the assembly and in order to ease the assembly operations of this part. In order to implement the method according to the disclosed embodiments, an additional layer of plies made out of a non-structural composite material, called calibrating plies, is applied onto the structural plies of the structural part, at least in an area where the thickness must be maintained within close tolerances and, after the composite material has been cured, the calibrating plies are machined in order to obtain the thickness required for the finished part. The thickness of the calibrating plies applied is determined according to the possible thicknesses of structural plies, taking into account the manufacturing spreads so that the machining operation for the calibrating plies does not affect the structural plies.

7 Claims, 2 Drawing Sheets

METHOD FOR MAKING A STRUCTURAL PART OF A COMPOSITE MATERIAL HAVING A CALIBRATED THICKNESS AND STRUCTURAL PART THUS OBTAINED

CROSS REFERENCE TO RELATED APPLICATIONS

This application is the National Stage of International Application No. PCT/FR2008/050624 International Filing Date, 9 Apr. 2008, which designated the United States of America, and which International Application was published under PCT Article 21 (2) as WO Publication No. WO2008/139115 A1 and which claims priority from French Application No. 07 54446 filed on 13 Apr. 2007, the disclosures of which are incorporated herein by reference in their entireties.

BACKGROUND

1. Field

The disclosed embodiments belong to the field of structures including structural elements made out of composite material.

More particularly, the aspects of the disclosed embodiments are directed to producing a structural element made out of composite material, whose thickness must be obtained locally during the production of said element, while complying with precise tolerances.

2. Brief Description of Related Developments

In the working structures, that is to say those undergoing significant strains regarding the resistance of the materials used to produce said structures, the elements constituting the structure must be assembled with precision, which assumes that the dimensions of the different assembled elements are perfectly coordinated between themselves, at least with respect to assembly interfaces.

In order to achieve this, the different elements are defined by the design offices with relatively close tolerances, which the manufacturing workshops must comply with.

Such problems occur in a general manner in numerous mechanical industries, and today are well managed when the elements of the structure to be assembled are produced from metallic materials, for which the machining techniques enable the dimensions of the elements to be managed by means of suitable precautions and relatively high costs, even when the tolerances on the dimensions are close.

When the structural elements are made out of composite materials, a situation occurring more and more often, in particular in aeronautic construction due to the advantages of composite materials in terms of mass for example, it turns out to be much more difficult to comply with the dimensions set for the assembly operations due to the difficulties in complying with the dimensional tolerances in the production of such elements.

The composites entering into the production of the elements concerned by the disclosed embodiments are composites comprising long fibres, for example carbon, Kevlar® or glass, maintained in an organic matrix, generally a resin cured by polymerisation (thermosetting resin) or by cooling after hot working (thermoplastic resin).

Such elements are also likely to include other materials, in particular metallic materials such as inserts or plates, for example Glare® formed by alternating fibre plies impregnated with resin and thin metallic sheets.

Indeed, these long fibre composite materials are usually applied in successive plies, which can reach up to several hundred in number, for which the orientation of the fibres is chosen at the level of each ply in order to obtain the mechanical characteristics desired for the element.

Due to the superpositioning of numerous plies during the production of the element and the methods of applying successive plies, the tolerances on the thicknesses of each ply and each interply accumulate and, in the worst case scenario, the finished element has thicknesses which are locally, in an assembly area, above the maximum value provided for or lower than the minimum value provided for.

Solutions are therefore very limited.

If the element has a thickness higher than the maximum thickness acceptable, an excessive thickness, said element cannot be assembled as with another element which does meet the expected dimensions.

The thickness of the element cannot be reduced by removing material, as this removal of material would locally reduce the number of fibre plies, and therefore affect the structural resistance of the part.

It is theoretically possible to produce the other element to be assembled with the suitable dimensions for taking into account the excessive thickness, however such a solution is not really acceptable from an industrial point of view, except for small quantities produced or for elements with a high added value, and in addition, this solution affects the interchangeability of the elements and therefore creates additional difficulties in the event of required repairs.

The most industrial solution therefore consists in scrapping the part with unacceptable, excessive thicknesses and abandoning its use.

If the element has a thickness lower than the minimum thickness acceptable, the most generally applied solution consists in filling the intermediate space created by the lack in thickness by means of spacers and/or an assembly sealant.

This solution is however limited to certain thicknesses due to its impact on the structural resistance of the assembly, and can, in particular for aeronautical structures, require the intervention of a design office in order to accept the solution for each case study and derogate from the nominal definition of the element and its assembly.

In addition, these solutions create industrial problems which are difficult to accept for practical purposes:

the filling operations are delicate, long and vary from one assembly to another;

the filling operations cannot be efficiently automated;

handling of the filling sealants is delicate due to toxicity risks for humans and the environment.

There is therefore real interest in developing a solution which would enable the thickness of elements made out of composite materials to be managed in view of producing a structural assembly, which is exactly what is proposed by the disclosed embodiments.

SUMMARY

In the disclosed embodiments, a solution is proposed, in particular to fully manage the thickness of a finished composite structure so that it falls between the predefined tolerance interval. This solution particularly enables the use of assembly sealants to be reduced to a minimum, which can be toxic to humans and the environment during the assembly of structures constituting the elements, for example of an aircraft-type vehicle. One essential purpose of the disclosed embodiments is to manage the thickness of said structures, in particular in the assembly areas. In order to achieve this, non-structural plies are placed onto structural plies made out of a composite part during the manufacture of the part. Once the plies are placed and cured, the non-structural plies, whose thickness is calculated by means of the method according to the disclosed embodiments, are machined in order to obtain the desired thickness for the part.

In the implementation of the method according to the disclosed embodiments, the introduction of a layer of additional non-structural plies is proposed, called calibrating plies, for the manufacture of a composite panel, the thickness of said layer being calculated according to the difference between the theoretical thickness of the panel and the actual thickness measured.

In a more general way, the method according to the disclosed embodiments:

improves the precision in dimensioning during manufacture enables an excellent surface appearance after machining to be obtained eases the intermediary assembly operation eases the final assembly operation erases or limits the use of assembly sealant.

The method according to the disclosed embodiments can be applied to composite materials comprised of fibres such as glass, kevlar or carbon fibres, used if required in conjunction with metallic foil.

The disclosed embodiments therefore essentially relates to a method for producing a structural part made out of composite material including structural plies made out of fibres in a cured resin, said structural plies being capable of resisting strains likely to be applied to the part in use, said structural part having, in at least one area, a predetermined thickness Enom, defined with production tolerances, said method including the steps of:

applying the structural plies, said structural plies having, when the resin has been cured, a total thickness Es, called structural thickness, in said predetermined thickness area;

applying, on at least one side of the structural plies, at least in the predetermined thickness area, one or several plies, which are not required for the structural resistance, called calibrating plies, such as a thickness ΔE of said calibrating plies being at least equal to the minimum value of Enom minus a thickness esm equal to a minimum value capable of being obtained and accepted for the structural thickness Es;

connecting the structural plies and calibrating plies;

when a total thickness of the part in the area considered, corresponding to the thickness Es added to the thickness ΔE, is higher than the maximum value accepted for Enom, calibrating the thickness of the part by machining the calibrating plies so that the total thickness of said part in said area is in an accepted tolerance interval for Enom.

In addition to the main characteristics mentioned in the previous paragraph, the method according to the disclosed embodiments can present one or several additional characteristics from the following:

the Enom value is determined during the design of the part to be higher than an ESM value corresponding to a maximum accepted thickness for the structural thickness Es.

the esm value is chosen to correspond to the structural thickness Es obtained when all of the structural plies each have a thickness corresponding to a minimum thickness of an expected thickness interval for said structural plies.

the ESM value is chosen to correspond to the structural thickness Es obtained when all of the structural plies each have a thickness corresponding to a maximum thickness of an expected thickness interval for said structural plies.

the calibrating plies are produced with a composite material including fibres in a resin compatible with the resin of the structural composite material.

the resin of the structural plies is chosen from the resins cured by polymerisation.

at least one calibrating ply is applied on each of the sides of the structural plies in at least the predetermined thickness area.

at least one ply, called a visual ply, is applied before or during the application of the calibrating plies between the structural plies on the one hand and the calibrating plies on the other hand, or between the calibrating plies, said visual ply including the characteristics enabling an observer, at least under certain observation conditions, to distinguish between said visual ply and the calibrating plies and structural plies when said visual ply is or has been machined during the calibrating operation.

This disclosed embodiments also relate to a structural part made out of composite material, at least in part, said composite material including fibres in a cured resin, said structural part having in at least one area, a thickness Enom, defined with a manufacturing tolerance, characterised in that said structural part includes in at least one Enom thickness area:

a stack of plies, called structural plies, required for the structural resistance of the part, with a thickness lower than or equal to Enom;

on at least one side of said stack of structural plies, at least one ply not required for structural resistance, called calibrating plies, which are connected to the structural plies;

which include a free machined side;

whose thickness is equal to an Enom value minus the thickness of the structural plies.

In addition to the main characteristics mentioned in the previous paragraph, the structural part according to the disclosed embodiments can present the following additional characteristic:

said part includes at least one ply, called a visual ply, between the structural plies on the one hand and the calibrating plies on the other hand or between the calibrating plies.

The disclosed embodiments and its different applications will be better understood after reading the following description and after examining the accompanying figures.

BRIEF DESCRIPTION OF THE DRAWINGS

These are only presented as a rough guide and in no way as a limited guide to the disclosed embodiments. The figures show.

DETAILED DESCRIPTION OF THE DISCLOSED EMBODIMENTS

A structural part 1 made out of composite material essentially includes a stack 2 of structural plies, each ply comprised of long resistant fibres, maintained in a resin which maintains the fibres in the desired position, ensures the cohesion of each ply with the neighbouring plies and ensures the stability of said structural part.

A number of plies of a structural part is determined, at every point of said part, according to the strains that said part must undergo when in use. Determining the number of plies, the type of fibres used, the type of resin used, the positioning and orientation of the fibres of the different plies is drawn from the known design of the structural parts made out of composite materials.

At every point of structural part 1, the number of plies determines a structural thickness of the part, which is the result of stack 2 of the structural plies and the resin. Thus, the thickness at one point is equal to the sum of the thicknesses of the plies and the thicknesses of the resin between two successive plies.

This thickness of the part therefore varies in practice from one manufactured part to another, on the one hand due to the differences in the thickness of the plies implemented because of the tolerances in the manufacture of the fibres, and on the other hand due to the compacting of the different plies, compacting which determines the quantity of resin remaining in the finished composite material, and which is very sensitive to some extent, to certain parameters of the manufacturing process.

For example, the date of manufacture of the resin with respect to the date of manufacture of the part, the storage conditions of the resin or the fibres pre-impregnated with resin, the polymerisation temperature and the pressure applied during polymerisation are many parameters for which industrial processes must accept certain tolerances, but which affect the fluidity of the resin during the production of structural part 1, and therefore which affect the quantity of resin remaining in the finished part.

Figure 1A:
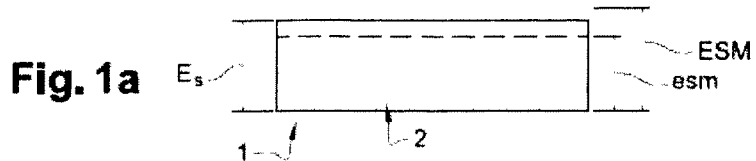
in FIG. 1, four sectional views (a, b, c and d) of a portion of a panel made out of composite material, illustrating four steps of the method according to the disclosed embodiments.
Figure 1B:
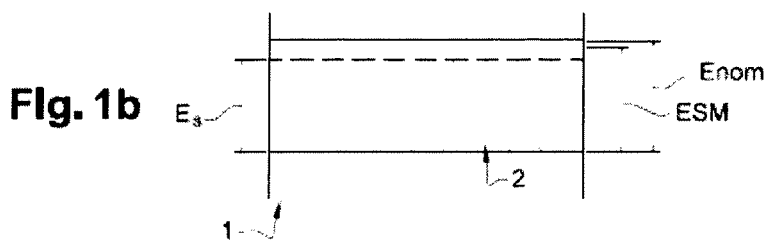
Figure 1C:
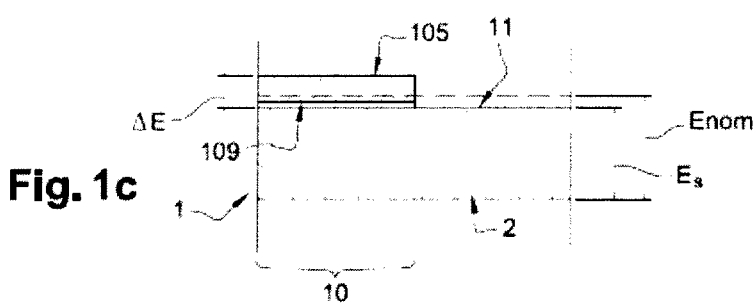
Figure 1D:
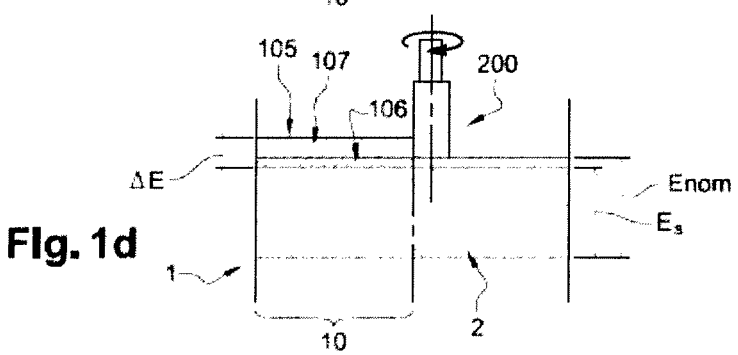

As illustrated in FIG. 1, in order to produce a structural part 1, whose thickness at every point of an area 10 must correspond to a nominal Enom value, which must fall between a predetermined minimum value and maximum value due to tolerances related to its assembly with another part for example, the method according to the disclosed embodiments essentially includes the steps of:

1—determining, FIG. 1*a*, at every point for which the thickness of structural part 1 must be calibrated, i.e. produced with a given thickness within a certain tolerance, a maximum thickness and a minimum thickness of structural plies 2, respectively called maximum structural thickness ESM and minimum structural thickness esm, of structural part 1, taking into account the acceptable manufacturing differences, said differences incorporating the tolerances on the thickness of the plies;

2—defining, FIG. 1*b*, the dimensions for said structural part and for the parts (not represented) to be assembles with said structural part in such a way as the assembly of said parts is correct when the thickness of structural part 1 is equal to a nominal thickness Enom at least equal to the maximum structural thickness ESM;

3—during the production of structural part 1, placing, FIG. 1*c*, at least in the considered areas 10 of the part, on at least one side 11 of the structural plies, one or several plies 105 not required for the structural resistance of the part, called non-structural plies, made out of composite material comprised of fibres in a resin capable of being cured and in number such as the thickness $\Delta E$ (after curing of the resin of the non-structural plies) of the non-structural ply (plies) being at last equal to the difference between the maximum structural thickness ESM and the minimum structural thickness esm, and in preference at least equal to the difference between the nominal thickness Enom and the minimum structural thickness esm;

4—machining, FIG. 1*d*, by removing material from structural part 1 produced, that is to say after curing of the resin of the structural plies and non-structural plies, a thickness of non-structural plies 107 in order to locally adjust the thickness of the part to the nominal thickness Enom.

For illustration purposes, the detailed description of the different steps essential to the method according to the disclosed embodiments and the alternative embodiments of said method, is drawn up for the production of a structural part made out of composite material in the shape of a panel represented in the figures.

This example of a part is however, not a limited example and one of ordinary skill in the art can, using this example, implement the disclosed embodiments for any shape of a part made out of composite material by adapting in particular the means of removing materials used.

The two first steps of the method are drawn from known techniques for dimensioning parts made out of composite materials. However, during the second step, the part designer is lead, contrary to his/her habits, to give the structural part and the parts which must be assembled to it, shapes and dimensions which correspond to a correct assembly for the nominal thicknesses Enom, higher than or equal to an accepted maximum value of the thickness obtained with the structural plies and with the precise assembly tolerances corresponding to the assembly tolerances which the structural part made out of composite material is not generally able to guarantee. Indeed, taking into account the manufacture tolerances on the thicknesses, generally the thickness Es, will be included between esm and ESM≤Enom, that is to say esm≤Es≤Enom.

In the third step, onto the layer of applied structural plies 2, for example on a mould, on a side 11 at least of said layer of structural plies, for example the side which must receive an assembly, at least locally in an assembly area (10), is superimposed a layer 105 produced with non-structural plies made out of a material which does not present any particular machining difficulties, called calibrating plies, whose thickness $\Delta E$ is at least high enough so that the total thickness Es+$\Delta E$ of the part, is higher than or at least equal to the nominal thickness, by taking into account the imposed thickness tolerances, i.e. that the total thickness is higher than the minimum quote desired, or even to the quote corresponding to the nominal Enom value. Such calibrating plies not playing a part in the structural resistance of part 1, are advantageously only placed in the assembly areas in order to avoid increases in mass and costs which the depositing onto other areas is likely to cause. The calibrating plies are preferably placed onto a side of the part opposite to the side in contact with a mould when a mould with a single shape, without a key form, is used to manufacture the part. Preferably, in order to produce this layer of calibrating plies, a resin is used, which is compatible with that of the layer of structural plies 2, in order to obtain a good level of cohesion between the structural plies and the calibrating plies. When all of the plies have been placed, the part is cured in a conventional manner, for example by polymerisation of the resin.

In one particular from of implementation, when structural plies (2) are produced with a resin whose relatively fluid state is contingent on the temperature, called thermosetting resins, this third step includes a phase of raising the temperature of the composite materials in order to ensure the connection between structural plies (2) and non-structural plies (105) (temperature raise able to correspond to a part forming step) and a cooling step at the end of which the structural and non-structural plies are connected.

Other known implementation methods for the production of parts made out of composite materials can be used in order to ensure the maintenance of the non-structural plies with the structural plies.

The fourth step of the method according to the disclosed embodiments consists in performing machining operation 200 of layer 105 of calibrating plies in such a way that the total thickness of composite part 1, sum of a thickness Es of the layer of structural plies 2 and a residual thickness after machining of layer 105 of calibrating plies, is at every point of said element, included in the total assembly thicknesses tolerated for said element, that is to say between the thicknesses determining the tolerance range of the objective nominal thickness Enom. Indeed, it is thus relatively easy to obtain a thickness of structural part 1 in the assembly area which is relatively precise due to the close tolerance that a machining operation enables, during which a surplus part 107 of layer 105 of calibrating plies is removed so as to leave only layer 106 required for calibration.

Figure 3:
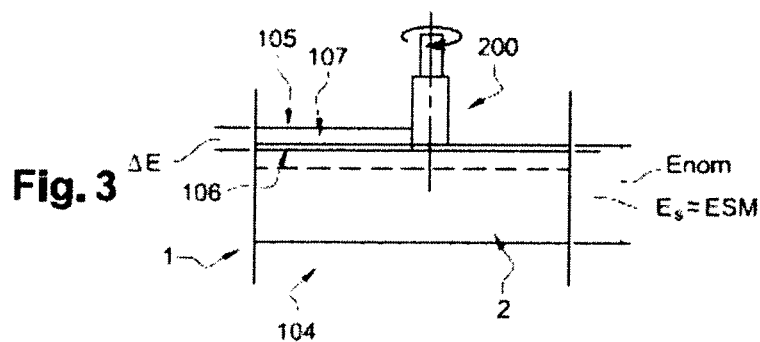
in FIG. 3, a sectional view of a portion of a composite panel with a maximum structural thickness, illustrating the machining step according to the disclosed embodiments.

According to the method, when the thickness of the layer of structural plies is significant, as illustrated in FIG. 3, due to a positive accumulation of tolerances, that is to say that the thickness of said layer of structural plies is close to ESM by lower value, the machining operation 200 leads to a significant part 107 of layer 105 of calibrating plies to be removed in order to reduce the thickness of the remaining layer 106 to a low value equal to Enom−ESM, to the nearest machining tolerance.

Figure 2:
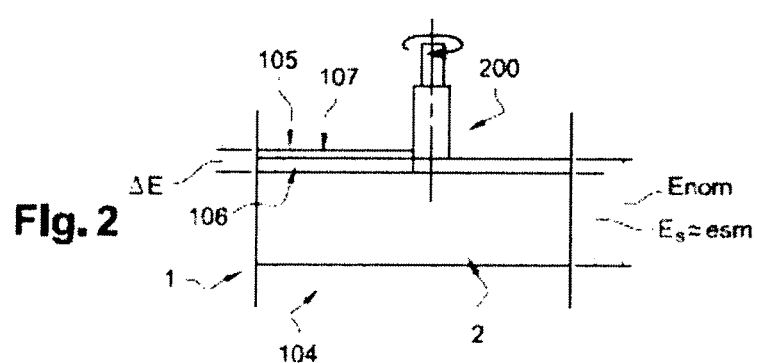
in FIG. 2, a sectional view of a portion of a composite panel with a minimum structural thickness, illustrating the machining step according to the disclosed embodiments.

However, when the thickness of the layer of structural plies 2 is low, as illustrated in FIG. 2, due to a negative accumulation of tolerances, that is to say that the thickness of said layer of structural plies 2 is close to esm by higher value, the machining operation 200 only requires a small amount of material 107 of layer 105 of calibrating plies to be removed, and the finished part still has a thickness close to Enom in the assembly area.

It should be noted that the esm and ESM values used to apply the method do not have to correspond to the absolute minimum and maximum values but to values capable of being surpassed by Es in practice. In these cases, limited in principle, the designer accepts the risk that a part may be produced outside of the tolerances and accepts a scrap factor for said parts.

According to an improvement of the method, a layer 109, called a visual detection ply, is placed at the interface between structural plies 2 and calibrating plies 105 or between calibrating plies 105, noticeably parallel to surface 11 of the layer of structural plies 2 during the implementation of the third step of the method. Indeed, during the machining of layer 105 of calibrating plies, for example due to a part whose layer of structural plies is comprised of a too large thickness, higher than the maximum thicknesses expected, the structural plies may deteriorate due to machining operation 200. Although exceptional in principle, such a situation must imperatively be detected as the integrity of the structural part is therefore no longer assured.

The visual ply is chosen in order to detect a machining operation which would reach said visual ply, for example with a contrasting colour with respect to the colour of the calibrating plies. Advantageously, the visual ply is produced with a different material to the other plies, for example a ply with glass fibres with respect to plies with carbon fibres whose colours are naturally different. The visual ply is preferably placed close to the interface between the layer of calibrating plies and the layer of structural plies. By a contrasting colour, all means can be considered for quickly detecting that which can also be obtained for example with a fluorescent visual ply when it is lit up with a light of a suitable wave length. Thus, when the machining of the layer of calibrating plies affects the visual ply, which becomes detectable by observation due to a contrast with the calibrating plies, an operator can interrupt the machining operation or, at the end of the machining operation, can conduct additional investigations in order to check if the part is acceptable or must be scrapped, taking into account unacceptable damage of the structural plies.

In one particular embodiment, the visual ply is placed with precision at the interface between the structural plies and the calibrating plies, and when said visual ply becomes visible, it is deduced that the structural layer has probably been damaged by the machining operation.

As a digital and unlimited example of implementation of the method, a panel of composite structure produced on a shape 104, called a mould is considered. In this example, the panel is a panel made from carbon fibres pre-impregnated with resin and applied in successive layers or plies onto mould 104, from which they take form. In this example, the panel considered is comprised of 200 structural plies in the area considered, whose thickness must be calibrated.

On the finished panel, each ply determines a thickness of 0.26 millimeters with an uncertainly of +/−3%. All of the thicknesses considered are thicknesses after curing of the resin or hot working. The structural thickness of the panel comprised of 200 plies is therefore 52 millimeters +/−3%, that is to say that esm=50.5 millimeters and ESM=53.5 millimeters after step 1 of the method, that is to say an uncertainly of 3 mm which is much higher than the recommended tolerances for structural assemblies of the type provided for.

According to step 2 of the method, the part is therefore defined by considering the thicknesses at the level of the assembly area higher than ESM=53.5 millimeters. By considering, for example a tolerance at the level of assembly of +/−0.2 millimeters, taking into account the expected machining precisions, the thickness Enom at the level of the assembly is chosen to be at least equal to 53.5+0.2=53.7 millimeters, for example Enom=53.8 millimeters in order to conserve a theoretical margin being always positive between the subsequent machining operation and the layer of structural plies. Indeed, it is advisable to have a minimum thickness to be machined, for example 0.1 millimeters, so that the means of removing the material work correctly.

According to step 3 of the method, the calibrating plies are applied with a total thickness of said calibrating plies ΔE high enough so that the sum of the thickness of the structural plies plus the thickness of the calibrating plies is always at least equal to the chosen Enom value, assuming that the layer of structural plies has the lowest esm value accepted, that is to say that ΔE≤53.8−esm=3.3 millimeters.

Preferably, taking into account the tolerance on the machining operations of +/−0.2 millimeters, it is deduced that ΔE≥3.3+0.2=3.5 millimeters.

Advantageously, the calibrating plies are only applied in areas 10 requiring calibration and as per the method implemented for the production of the composite part, for example the unit is subjected to compacting pressure and cooking. In this example, if the layer of calibrating plies is produced with plies of, for example, 0.2 millimeters +/−5% in finished thickness, that is to say a minimum thickness of 0.2×0.95=0.19 millimeters, the number of calibrating plies retained in order to guarantee the desired thickness 3.5 millimeters will be 19 plies whose thickness ΔE will fall between 3.5 millimeters minimum and 0.2×1.05×19≈4 millimeters maximum. At the end of step 3 and in the area considered, the part therefore has a thickness falling between at the minimum, esm+3.5=54 millimeters;

at the maximum, ESM+4=57.5 millimeters;

for a desired nominal thickness Enom of 53.8 millimeters +/−0.2 millimeters.

At this stage of the method, it should be noted on the one hand that the manufacturing spreads of the element made out of composite material are significant 57.5−54≈+/−1.75 millimeters compared to the traditional tolerances accepted for the considered structural assemblies of +/−0.2 millimeters, and on the other hand that the thickness is still higher, or at least equal to the desired nominal thickness Enom=53.8 millimeters, and that it is therefore possible to reduce the thickness by machining in order to obtain a thickness equal to the desired nominal thickness Enom within the accepted tolerance.

The fourth step of the method consists in particular in machining calibrating plies 105, a machining operation which, due to the retained thicknesses, is only performed by removing a part 107 of the calibrating plies. If one or several visualisation plies 109 are applied before the calibrating plies or inserted between the calibrating plies, said visualisation plies are applied as calibrating plies. The thickness of said visualisation plies is thus considered in the calculation of the thicknesses or, advantageously if their small number or thickness enables, their effect on the thickness is negligible.

The panel thus produced therefore includes at least one first layer made out of composite material, formed from stacking structural plies of a thickness which is always lower than a desired thickness for an assembly, and, at least locally in assembly areas, at least one second, non-structural layer, formed from calibrating plies superimposed onto the structural layer in a desired thickness area, said layer formed from calibrating plies being machined to a desired nominal thickness quote for the structural part.

Although described in a simple geometrical example, one of ordinary skill in the art is capable of generalising the disclosed embodiments so as to take into account more complex forms of the structural parts capable of having variable thicknesses and of having calibrating plies on different areas of structural plies on one side or on several sides.

The structural part includes, where required, other elements capable of locally modifying the thickness of the part. Such elements consist for example of metallic or non-metallic structural inserts, filling materials such as mousses or other alveolar materials, or even plies with particular functions such as plies in isolation strips or bonding surfaces.

In these cases, it is understood that the thicknesses of each of the elements constituting the thickness of the structural part in the area considered are taken into account with the production uncertainties of said elements on their own thicknesses, as for the structural plies, so as to apply the method according to the disclosed embodiments.

What is claimed is:

1. A method for producing a structural part from structural plies comprising fibres in a cured resin, said structural plies being capable of resisting strain, the method compromising:

determining a minimum structural thickness value and a maximum structural thickness value for a predetermined thickness area of the structural part;

determining a normal thickness value Enom for the predetermined thickness area of the structural part, wherein the normal thickness value is greater than the maximum structural thickness value;

applying the structural plies to achieve, upon curing the resin, a structural thickness Es for the structural part, wherein the structural thickness Es is between the minimum structural thickness value and the maximum structural thickness values;

applying one or more non-structural calibrating plies, not required for strain resistance, to at least one side of the structural plies to achieve a thickness ΔE of the one or more non-structural calibrating plies at least equal to the nominal thickness value Enom for the predetermined thickness area of the structural part minus the minimum structural thickness value;

connecting the structural plies and non-structural calibrating plies; and calibrating a cured thickness of the structural part by machining the non-structural calibrating plies so that the cured thickness of said structural part in the predetermined thickness area is within upper and lower tolerances for the nominal thickness value Enom.

2. A method according to claim 1, wherein the minimum structural thickness value is determined from a minimum thickness of each of the structural plies.

3. A method according to claim 1, wherein the maximum structural thickness value is determined from a maximum thickness of each of the structural plies.

4. A method according to claim 1, wherein the non-structural calibrating plies are produced with a composite material including fibres in a resin compatible with the resin of structural composite material.

5. A method according to claim 1, wherein the resin of the structural plies is chosen from the resins cured by polymerisation.

6. A method according to claim 1, wherein at least one non-structural calibrating ply is applied on each of the sides of structural plies in at least the predetermined thickness area.

7. A method according to claim 1, wherein at least one visual ply is applied between the structural plies on the non-structural calibrating plies, or between the non-structural calibrating plies, said visual ply comprising characteristics visually distinguishing the at least one visual ply from the non-structural calibrating plies and from the structural plies upon machining the non-structural calibrating plies.

* * * * *